(12) United States Patent
Bai

(10) Patent No.: US 8,137,241 B2
(45) Date of Patent: Mar. 20, 2012

(54) SYSTEM AND METHOD FOR AUTOMATIC TRANSMISSION SHIFT CONTROL

(75) Inventor: Shushan Bai, Ann Arbor, MI (US)

(73) Assignee: GM Global Technology Operations LLC

( * ) Notice: Subject to any disclaimer, the term of this patent is extended or adjusted under 35 U.S.C. 154(b) by 407 days.

(21) Appl. No.: 12/534,442

(22) Filed: Aug. 3, 2009

(65) Prior Publication Data

US 2011/0028272 A1    Feb. 3, 2011

(51) Int. Cl.
  *B60W 10/06*    (2006.01)
  *B60W 10/10*    (2006.01)
(52) U.S. Cl. ......... 477/110; 477/111; 477/127; 477/130
(58) Field of Classification Search .................. 477/107, 477/110, 111, 127, 130
  See application file for complete search history.

(56) References Cited

U.S. PATENT DOCUMENTS

| 5,407,401 A | 4/1995 | Bullmer et al. |
| 5,902,213 A * | 5/1999 | Tsutsui et al. ................. 477/155 |
| 7,351,183 B2 | 4/2008 | Fujii et al. |
| 7,674,203 B2 * | 3/2010 | Steinhauser et al. .......... 477/130 |
| 7,682,285 B2 * | 3/2010 | Kraska et al. .................. 477/130 |
| 7,850,573 B2 * | 12/2010 | Jeon et al. ...................... 477/130 |

FOREIGN PATENT DOCUMENTS

| DE | 4204401 A1 | 8/1993 |
| EP | 1950462 A1 | 7/2008 |

* cited by examiner

*Primary Examiner* — Ha D. Ho

(57) ABSTRACT

A engine control system for an automatic transmission includes an engine torque control module that increases engine torque from a first torque level to a second torque level during a period before a shift from a first gear ratio to a second gear ratio, wherein the first gear ratio is greater than the second gear ratio, wherein the first torque level is based on driver input and vehicle speed, and wherein the second torque level is based on the first torque level and the first and second gear ratios. A transmission control module decreases a torque capacity of a first clutch to a third torque level during the period and increases a torque capacity of a second clutch to a fourth torque level during the period, wherein the fourth torque level is based on the second torque level and a torque gain of the second clutch.

22 Claims, 6 Drawing Sheets

SYSTEM AND METHOD FOR AUTOMATIC TRANSMISSION SHIFT CONTROL

FIELD

The present disclosure relates to engine control systems and more particularly to control systems for automatic transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an air intake and a throttle. The air is mixed with fuel to create an air/fuel (A/F) mixture. The A/F mixture is combusted within cylinders to drive pistons that apply a torque to a crankshaft. For example, the torque applied to the crankshaft from the pistons due to combustion may be referred to as "engine torque." The engine torque may cause the crankshaft to rotate. The rotational speed of the crankshaft may be referred to as "engine speed," and may be measured in revolutions per minute, or RPM.

Engine torque is transferred from the crankshaft to one or more wheels of a vehicle via a transmission. For example, the transmission may be a manual transmission (i.e. operated by a driver) or an automatic transmission (i.e. operated by a control module). The transmission may further include a plurality of gears that translate the engine torque to wheel torque. In other words, each of the plurality of gears may translate the rotational speed of the engine crankshaft to a different rotational speed of the vehicle wheels. More specifically, gear ratios represent relationships between each of the plurality of gears and the crankshaft, respectively. For example only, a lowest gear (e.g. first gear) may include a gear ratio of 3.5:1 and a highest gear (e.g. fifth gear) may include a gear ratio of 0.7:1.

A shift operation between the plurality of gears of the transmission may be one of an up-shift (i.e. shifting to a higher gear) or a down-shift (i.e. shifting to a lower gear). The shift operation may further be defined as power-on (i.e. a shift operation when an accelerator pedal is depressed) or power-off (i.e. a shift-operation when an accelerator pedal is not depressed). Power-on shift operations (up-shifts and down-shifts) may require more precise control due to driver input during the shift operation (e.g. via an accelerator pedal).

SUMMARY

A engine control system for an automatic transmission includes an engine torque control module and a transmission control module. The engine torque control module increases engine torque from a first torque level to a second torque level during a period before a shift from a first gear ratio to a second gear ratio, wherein the first gear ratio is greater than the second gear ratio, wherein the first torque level is based on driver input and vehicle speed, and wherein the second torque level is based on the first torque level and the first and second gear ratios. The transmission control module decreases a torque capacity of a first clutch to a third torque level during the period and increases a torque capacity of a second clutch to a fourth torque level during the period, wherein the fourth torque level is based on the second torque level and a torque gain of the second clutch.

A method for controlling an automatic transmission includes increasing engine torque from a first torque level to a second torque level during a period before a shift from a first gear ratio to a second gear ratio, wherein the first gear ratio is greater than the second gear ratio, wherein the first torque level is based on driver input and vehicle speed, and wherein the second torque level is based on the first torque level and the first and second gear ratios, decreasing a torque capacity of a first clutch to a third torque level during the period, and increasing a torque capacity of a second clutch to a fourth torque level during the period, wherein the fourth torque level is based on the second torque level and a torque gain of the second clutch.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
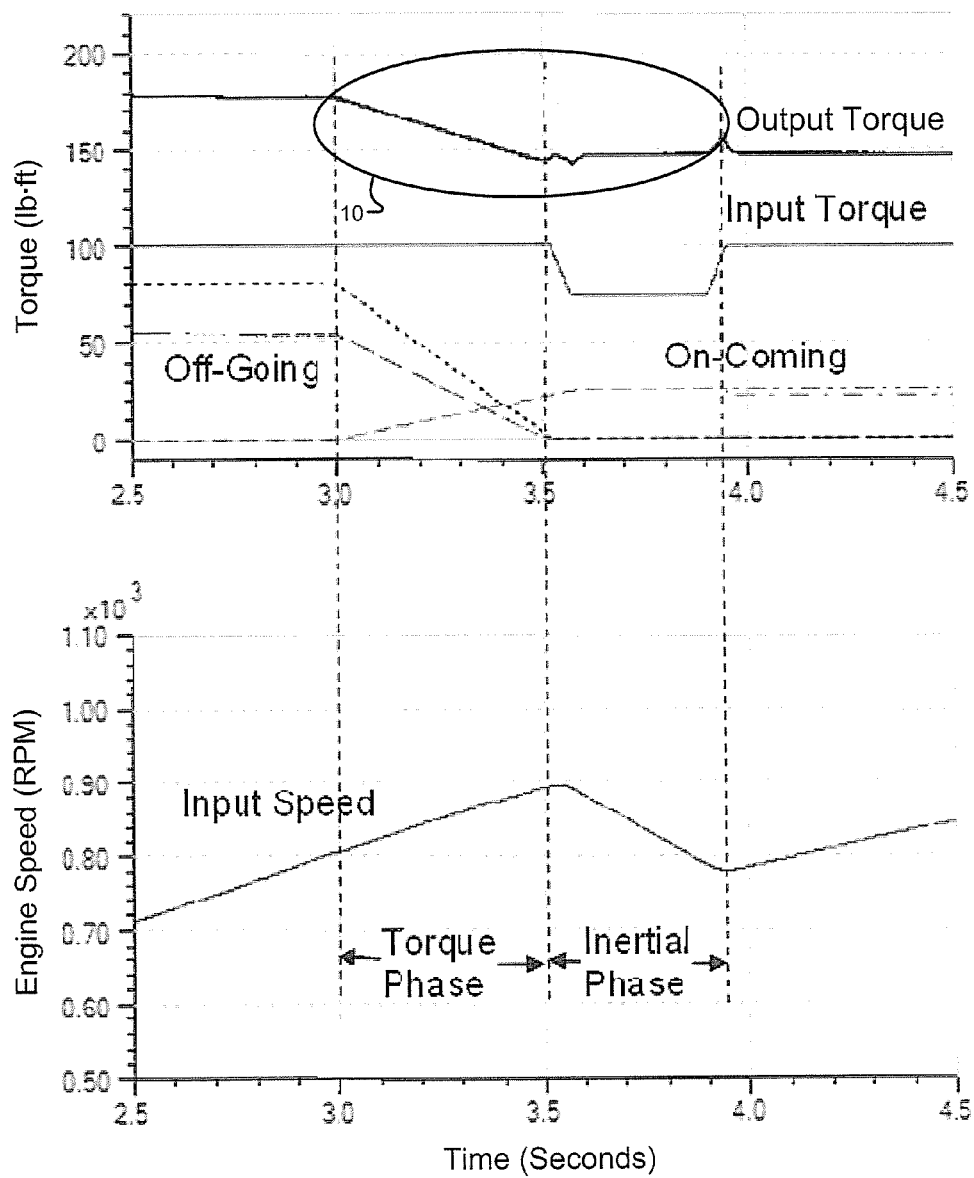
FIG. 1 is a timing diagram of engine speed and transmission torque during a power-on up-shift according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a timing diagram illustrates engine speed (RPM) and various torque levels (lb·ft) during a conventional power-on up-shift of an automatic transmission. During a first phase of the up-shift, referred to as a "torque phase," torque capacity of a first clutch (the "off-going clutch") corresponding to a current gear is decreased and torque capacity of a second clutch (the "on-coming clutch") is increased. In other words, during the "torque phase" the off-going clutch is disengaging and the on-coming clutch is engaging.

However, input torque to the automatic transmission (i.e. from a crankshaft or from a torque converter) is maintained at a constant level during the "torque phase." Therefore, output torque from the automatic transmission (i.e. to a driveline or wheels of a vehicle) decreases during the "torque phase" due to friction as the on-coming clutch engages.

During a second phase of the up-shift, referred to as an "inertial phase," input torque and engine speed decrease after the second clutch engages with a new higher gear. However, the output torque remains at the decreased level both during and after the "inertial phase." This drop in torque across the power-on up-shift (defined by area 10) may increase noise, vibration, and/or harshness (NVH), and/or may decrease performance.

Figure 2:
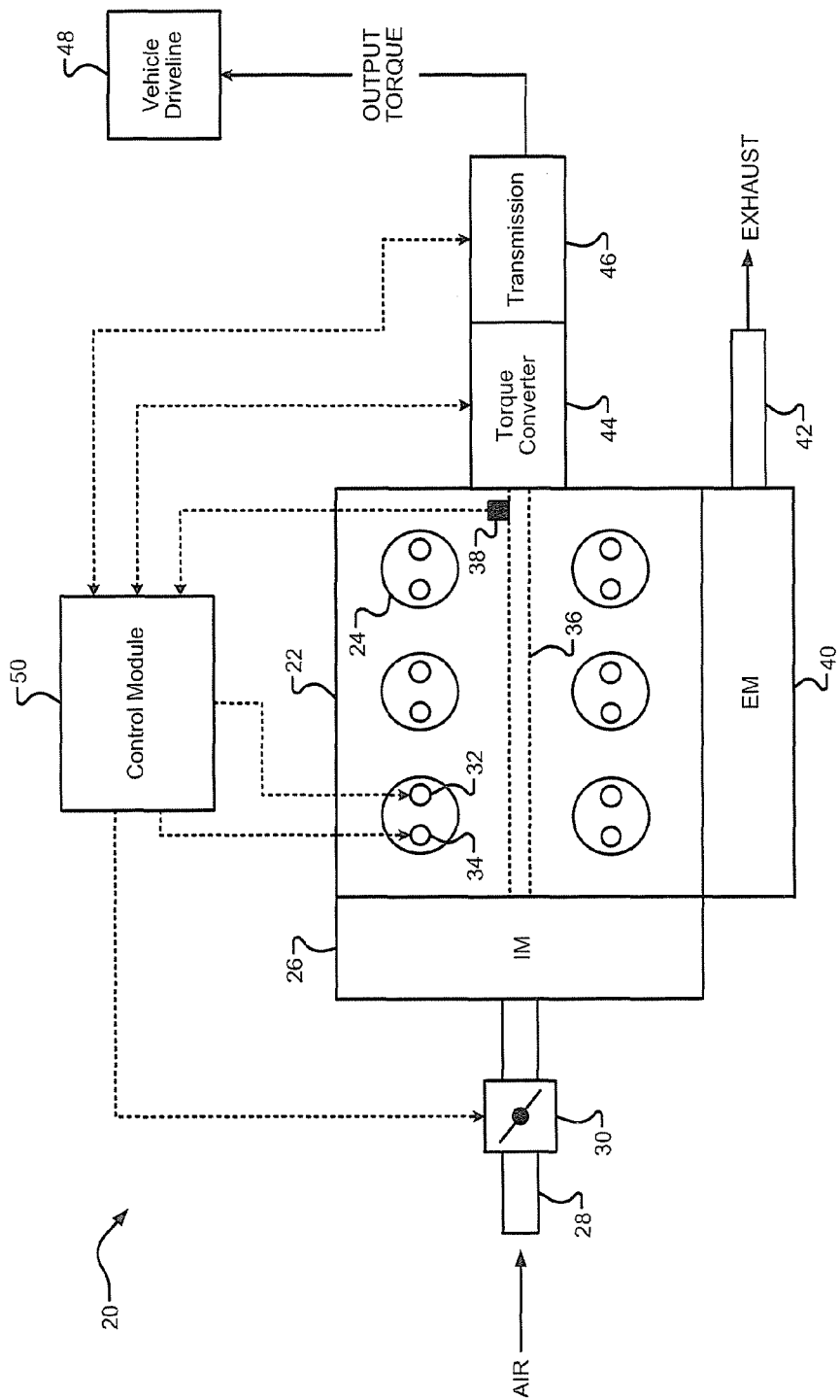
FIG. 2 is a functional block diagram of an engine system according to the present disclosure.

Referring now to FIG. 2, an engine system 20 includes an engine 22. The engine 22 includes a plurality of cylinders 24. It may be appreciated that while 6 cylinders are shown, other numbers of cylinders may also be used.

Air is drawn into the engine 22 and into an intake manifold 26 through an air intake 28 that is regulated by a throttle 30. The air is distributed to the cylinders 24 and combined with fuel from a fuel tank (not shown). For example, the fuel may be injected into the cylinders 24 by a plurality of fuel injectors 32.

The air-and-fuel (A/F) mixture in the plurality of cylinders 24 is compressed by pistons (not shown) and may be combusted by a plurality of spark plugs 34, respectively. The combustion of the A/F mixture drives the pistons (not shown), which rotatably turn a crankshaft 36 to generate engine torque. A crankshaft sensor 38 may measure a rotational speed (RPM) of the crankshaft 36, hereinafter referred to as engine speed. Alternatively, the crankshaft sensor 38 may measure a torque of the engine crankshaft 36, hereinafter referred to as engine torque. Exhaust gases may be expelled from the cylinders 24 through an exhaust manifold 40 and an exhaust system 42.

The crankshaft 36 drives a transmission 46 through a torque converter 44. The transmission 46 may transfer the engine torque to a vehicle driveline 48 (e.g., vehicle wheels) through one of a plurality of gear ratios. More specifically, the transmission 46 may shift between the gear ratios based on a shift schedule that corresponds to operating conditions such as engine speed and vehicle speed.

The transmission 46 typically includes a plurality of clutches that are selectively engaged/disengaged to establish a desired gear ratio. Thus, when shifting between gear ratios, clutch-to-clutch shifts occur. More specifically, at least one clutch is disengaged (an off-going clutch) while at least one clutch is concurrently engaged (an on-coming clutch). For example, control of the clutch-to-clutch shift may be based on engine torque.

A control module 50 regulates operation of the engine system 20. For example, the control module 50 may control the throttle 30 and the fuel injectors 32 to control the A/F ratio in the engine 22. Additionally, for example, the control module 50 may control the spark plugs 34 to control the ignition timing of the engine 22. Therefore, for example, the control module 50 may regulate engine torque and engine speed by controlling air, fuel, and/or spark.

More specifically, the control module 50 may control engine torque (i.e. input torque to the transmission 46) during up-shift operations. In one embodiment, the control module 50 may increase engine torque during an up-shift operation. The increase in input toque to the transmission 46 may maintain drive torque (i.e. output torque) from the transmission 46 at a constant level across the up-shift operation. Thus, NVH may decrease and/or performance may increase.

Figure 3:
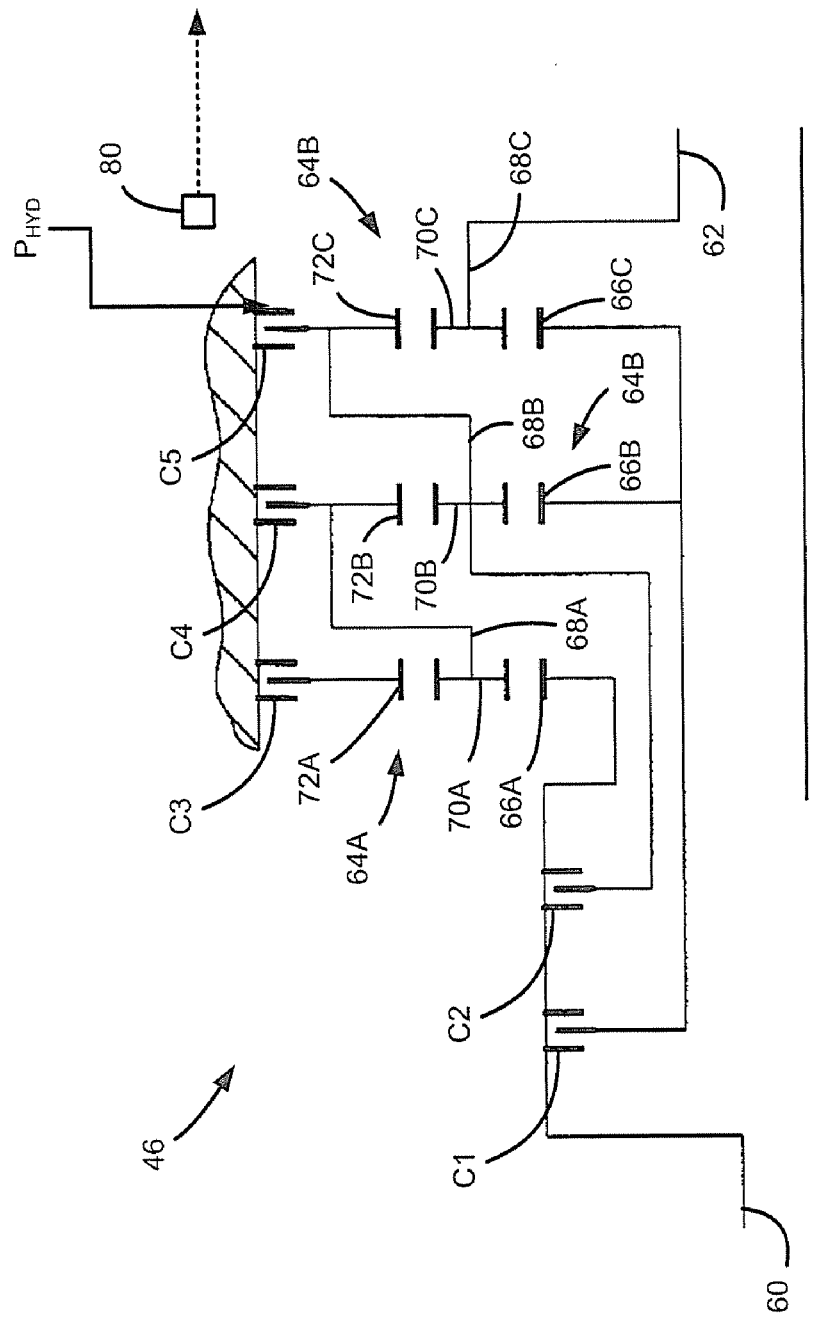
FIG. 3 is a functional block diagram of a transmission according to the present disclosure.

Referring now to FIG. 3, the transmission 46 is shown in more detail. In one embodiment, the transmission 46 may be a six-speed automatic transmission as shown in FIG. 3. However, it can be appreciated that various other transmissions may also be implemented, such as different types of transmissions and transmissions that include different numbers of gears. For example only, the transmission may be a dual clutch transmission.

The transmission 46 includes an input shaft 60, an output shaft 62 and three inter-connected planetary gear sets 64A, 64B and 64C, respectively. The planetary gear sets 64A, 64B, and 64C include respective sun gears 66A, 66B, and 66C, carriers 68A, 68B, and 68C, planetary gears 70A, 70B, and 70C and ring gears 72A, 72B, and 72C. The transmission 46 further includes clutches C1-C5 that are selectively engaged to establish a desired gear ratio of the transmission 46.

More specifically, the input shaft 60 continuously drives the sun gear 66A of the gear set 64A, selectively drives the sun gears 66B, 66C of the gear sets 64B, 64C via the clutch C1 and selectively drives the carrier 68B of the gear set 64B via the clutch C2. The ring gears 72A, 72B, and 72C of the gear sets 64A, 64B, and 64C are selectively grounded via the clutches C3, C4 and C5, respectively. Hydraulic pressure ($P_{HYD}$) is selectively provided to the various clutches to regulate engagement of the clutches. A pressure switch 80 is associated with the pressure line to each clutch and switches between ON and OFF states. More specifically, when $P_{HYD}$ is below a threshold pressure ($P_{THR}$), the switch is in the OFF state. When $P_{HYD}$ is greater than $P_{THR}$, the switch state is ON.

As diagrammed in Table 1 below, the state of the clutches C1-C5 (i.e., engaged or disengaged) may be controlled to provide six forward speed ratios (1, 2, 3, 4, 5, 6), a reverse speed ratio (R), or a neutral condition (N).

TABLE 1

|     | C1 | C2 | C3 | C4 | C5 |
|-----|----|----|----|----|----|
| $1^{st}$ | X  |    |    |    | X  |
| $2^{nd}$ | X  |    |    | X  |    |
| $3^{rd}$ | X  |    | X  |    |    |
| $4^{th}$ | X  | X  |    |    |    |
| $5^{th}$ |    | X  | X  |    |    |
| $6^{th}$ |    | X  |    | X  |    |
| R   |    |    | X  |    | X  |
| N   |    |    |    |    | X  |

For example, the second forward speed ratio (i.e. $2^{nd}$ gear) is established when clutches C1 and C4 are engaged. Shifting from one speed forward speed ratio to another may generally be achieved by disengaging one clutch (i.e., the off-going clutch) while engaging another clutch (i.e., the on-coming clutch). For example, the transmission 46 may be down-shifted from second gear to first gear by disengaging clutch C4 while engaging clutch C5.

Figure 4:
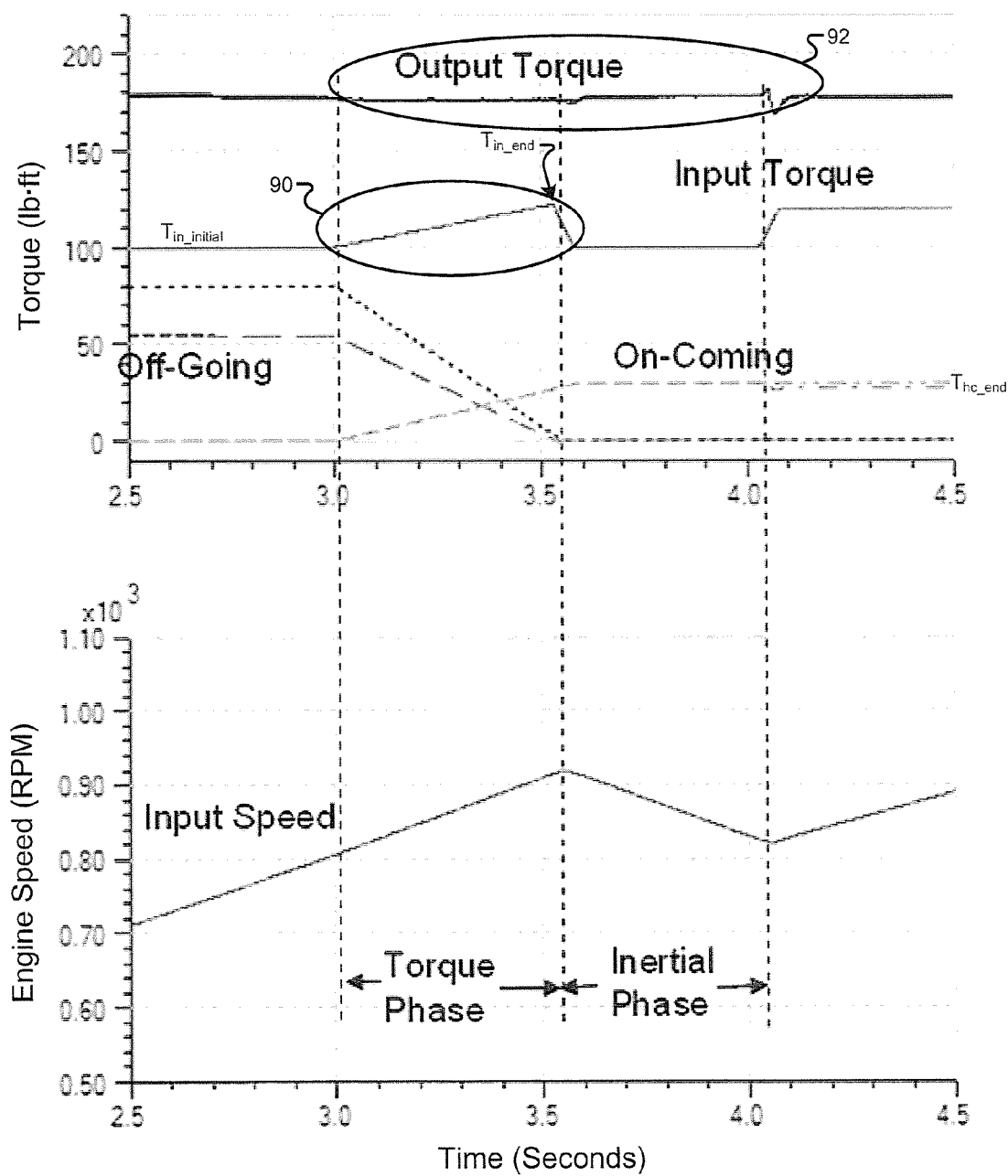
FIG. 4 is a functional block diagram of a control module according to the present disclosure.

Referring now to FIG. 4, a timing diagram illustrates engine speed (RPM) and various torque levels (lb·ft) during a power-on up-shift of the transmission 46. As shown, engine RPM increases at a faster rate during the "torque phase" than prior the torque phase. In other words, input torque to the transmission 46 (i.e. from the crankshaft 36 or the torque converter 44) steadily increases during the "torque phase," as shown by area 90. For example, input torque ($T_{in}$) may increase from an initial torque level ($T_{in\_initial}$) to a final input torque level ($T_{in\_end}$) during the "torque phase."

Input torque ($T_{in}$) may decrease to the initial input torque level ($T_{in\_initial}$) during the "inertial phase" due to friction when torque to the high clutch (i.e. the on-coming clutch) increases to $T_{hc\_end}$ and thus engages, However, after the high clutch engages, input torque ($T_{in}$) may then return to the final input torque level ($T_{in\_end}$).

Therefore, output torque of the transmission 46 may be maintained at a constant level before, during, and after (i.e. across) the power-on up-shift operation, as illustrated by area 92. For example, the constant output torque before, during, and after the power-on up-shift may decrease NVH and/or may improve performance.

Figure 5:
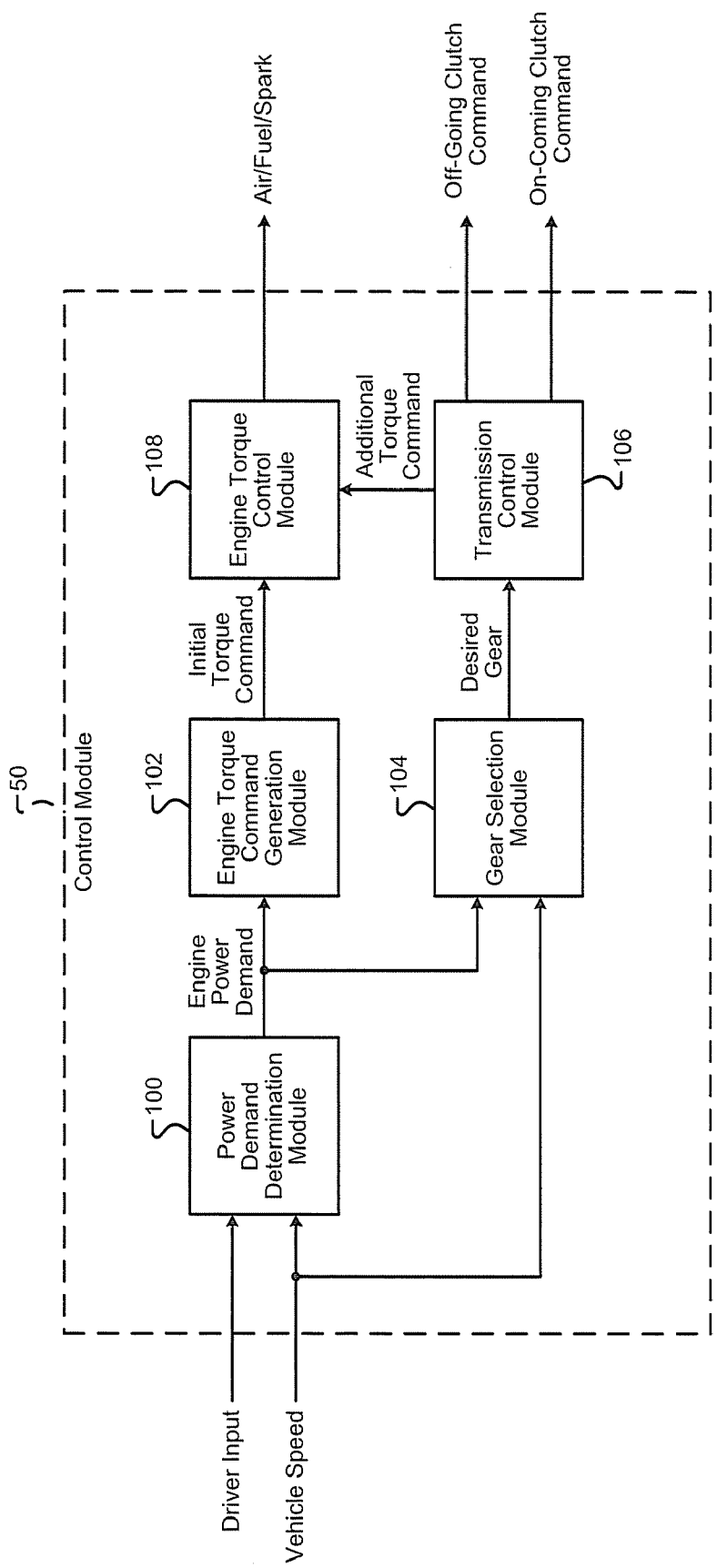
FIG. 5 is a timing diagram of engine speed and transmission torque during a power-on up-shift according to the present disclosure.

Referring now to FIG. 5, the control module 50 is shown in more detail. The control module 50 may include a power demand generation module 100, a torque command generation module 102, a gear selection module 104 a transmission control module 106, and an engine torque control module 108.

The power demand generation module 100 receives driver input. For example, the driver input may be a position of an accelerator pedal. The power demand generation module 100 also receives a vehicle speed. For example, the vehicle speed may be based on a rotational speed of the vehicle wheels 48 (i.e. from an anti-lock braking system, or ABS sensor) or a rotational speed of an output shaft of the transmission 46. The power demand generation module 100 generates an engine power demand based on the driver input and the vehicle speed.

The torque command generation module 102 receives the engine power demand. The torque command generation module 102 generates an engine torque command based on the engine power demand. More specifically, the engine torque command corresponds to engine torque required to meet the engine power demand. The engine torque command may correspond to the initial input torque level ($T_{in\_initial}$), as described above.

The gear selection module 104 also receives the engine power demand and the vehicle speed. The gear selection module 104 determines a desired gear of the transmission 46 based on the engine power demand and the vehicle speed. In one embodiment, for example, the desired gear may correspond to a predetermined shift schedule.

The transmission control module 106 receives the desired gear of the transmission 46. The transmission control module 106 generates an on-coming clutch torque capacity command and an off-going clutch torque capacity command. For example, a torque capacity command to a clutch may represent a desired clutch torque capacity by controlling force (i.e. pressure) applied to a clutch via a hydraulic piston. Thus, the off-going clutch command may decrease force (i.e. pressure) applied to the off-going clutch to a first torque level. For example, the first torque level may be zero. Additionally, the on-coming clutch command may increase force applied to the on-coming clutch to a second torque level, referred to as a final high clutch torque level ($T_{hc\_end}$). More specifically, the final high clutch torque level ($T_{hc\_end}$) may be modeled as follows:

$$T_{hc\_end} = T_{in\_initial} \frac{r_l \cdot K_{hc}}{r_h},$$

where $r_l$ is a gear ratio of the low gear (i.e. the current gear), $r_h$ is a gear ratio of the high gear (i.e. the new gear), and $K_{hc}$ is a torque gain of the high clutch, which may be defined as a ratio of the high clutch torque capacity to the input torque ($T_{hc}/T_{in}$).

The transmission control module 106 may also generate an engine torque command during a shift operation of the transmission 46. For example, the engine torque command may correspond to an additional (i.e. ramped-up) input torque level ($T_{in\_add}$) that is higher than the initial torque level ($T_{in\_initial}$). More specifically, the additional engine torque level ($T_{in\_add}$) may be modeled as follows:

$$T_{in\_add} = T_{hc} \frac{r_l - r_h}{r_l \cdot K_{hc}},$$

where $T_{hc}$ is the high (i.e. on-coming) clutch torque capacity command.

The engine torque control module 108 receives the initial engine torque command ($T_{in\_initial}$) from the engine torque command generation module 102 and the additional engine torque command ($T_{in\_add}$) from the transmission control module 106. The engine torque control module 108 controls engine torque (i.e. torque input to the transmission 46) based on the received engine torque commands. More specifically, the engine torque control module 108 controls engine torque ($T_{in}$) as follows:

$$T_{in} = T_{in\_initial} + T_{in\_add} \rightarrow T_{in} = T_{in\_initital} + T_{hc} \frac{r_l - r_h}{r_l \cdot K_{hc}}.$$

Thus, a final input torque level ($T_{in\_end}$) (i.e. the maximum input torque during the "torque phase") may be modeled as follows:

$$T_{in\_end} = T_{in\_initial} \frac{r_l}{r_h}.$$

Figure 6:
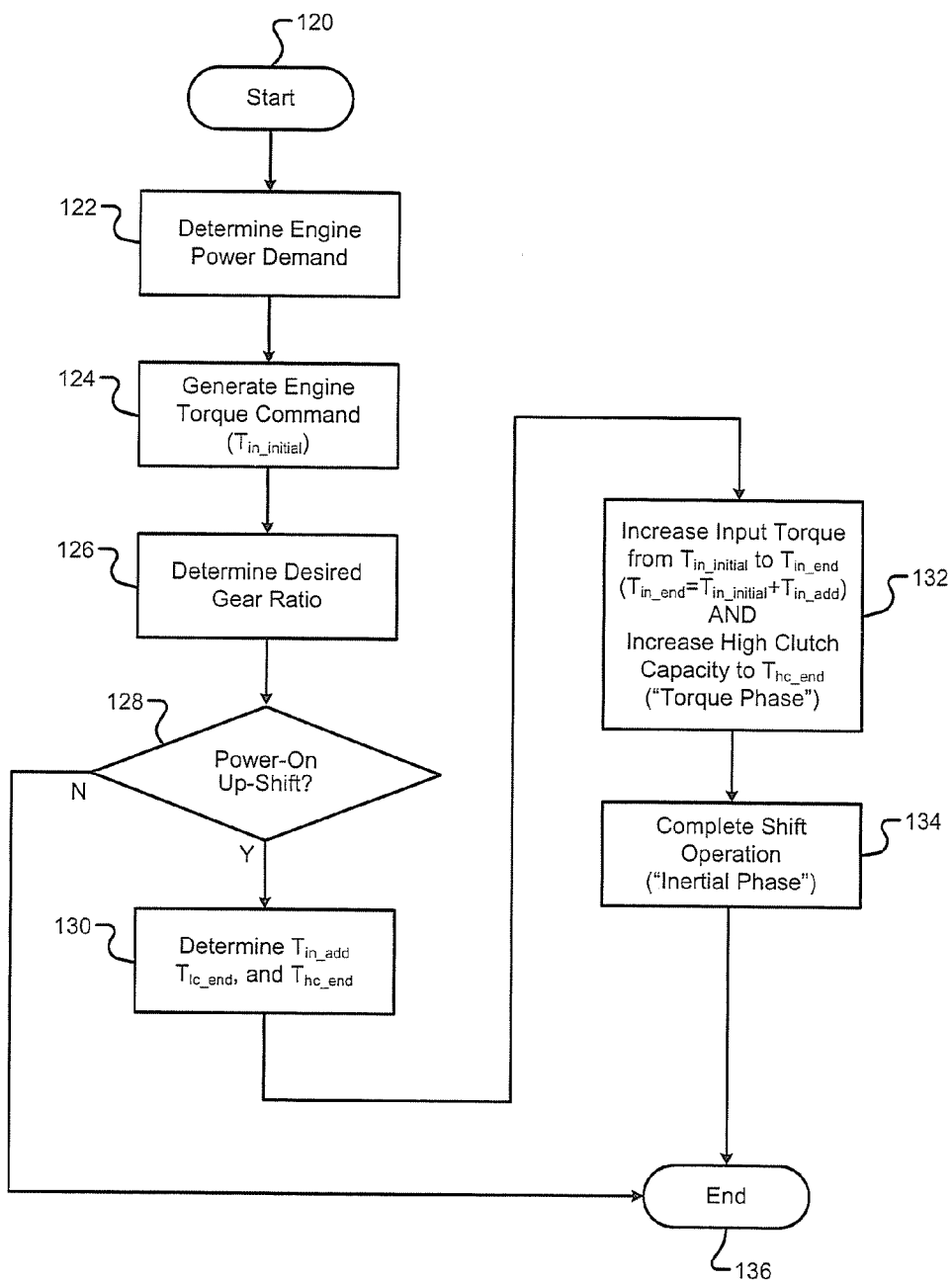
FIG. 6 is a flow diagram of a method of controlling the engine system according to the present disclosure.

Referring now to FIG. 6, a method of operating the engine system 10 begins in step 120. In step 122, the control module 50 determines an engine power demand based on driver input and vehicle speed. In step 124, the control module 50 generates an engine torque command ($T_{in\_initial}$) based on the engine power demand. In step 126, the control module 50 determines a desired gear of the transmission 46 based on the engine power demand.

In step 128, the control module 50 determines whether a power-on up-shift operation is going to occur. For example, the power-on up-shift operation may be according to a predetermined shift schedule. Alternatively, the power-on up-shift operation may be commanded when the control module 50 determines a higher gear is desired. If true, control may proceed to step 120. If false, control may proceed to step 126 and control may end.

In step 120, the control module 50 generates an off-going clutch torque capacity command ($T_{lc\_end}$) (e.g. ramp down to zero), an on-coming clutch torque capacity command ($T_{hc\_end}$), and an additional engine torque command ($T_{in\_add}$). The additional engine torque command ($T_{in\_add}$) corresponds to an engine torque level required to maintain constant output torque during the power-on up-shift operation.

In step 122, the control module 50 increases engine torque from the initial input torque level ($T_{in\_initial}$) to the final input torque level ($T_{in\_end}$) during the "torque phase" (e.g., $T_{in\_end} = T_{in\_initial} + T_{in\_add}$). Also in step 122, the control module increases the high clutch torque capacity from a first level (e.g. zero) to the final high clutch torque capacity ($T_{hc\_end}$). In step 124, the control module 50 completes the shift from the current (low) gear to the new (high) gear (i.e. the "intertial phase"). Control may then end in step 126.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A engine control system for an automatic transmission, comprising:
an engine torque control module that increases engine torque from a first torque level to a second torque level during a period before a shift from a first gear ratio to a second gear ratio, wherein the first gear ratio is greater than the second gear ratio, wherein the first torque level is based on driver input and vehicle speed, and wherein the second torque level is based on the first torque level and the first and second gear ratios; and
a transmission control module that decreases a torque capacity of a first clutch to a third torque level during the period and that increases a torque capacity of a second clutch to a fourth torque level during the period, wherein the fourth torque level is based on the second torque level and a torque gain of the second clutch.

2. The engine control system of claim 1, wherein the engine torque control module increases engine torque during the period based on a sum of the first torque level and an additional torque amount.

3. The engine control system of claim 2, wherein the additional torque amount is based on a product of the torque capacity of the second clutch and a difference between the first and second gear ratios, divided by a product of the first gear ratio and the torque gain of the second clutch.

4. The engine control system of claim 3, wherein the torque gain of the second clutch is based on a ratio of the torque capacity of the second clutch and the engine torque.

5. The engine control system of claim 3, wherein the fourth torque level is based on a product of the first torque level, the first gear ratio, and the torque gain of the second clutch, divided by the second gear ratio.

6. The engine control system of claim 1, wherein the second torque level is based on a product of the first torque level and the first gear ratio, divided by the second gear ratio.

7. The engine control system of claim 1, wherein the third torque level is zero.

8. The engine control system of claim 1, wherein the torque capacity of the first clutch reaches the third torque level before the torque capacity of the second clutch reaches the fourth torque level.

9. The engine control system of claim 1, wherein the engine torque control module controls engine torque by controlling at least one of a throttle, a plurality of fuel injectors, and a plurality of spark plugs.

10. The engine control system of claim 1, wherein output torque of the automatic transmission is maintained at a constant level before, during, and after the shift operation.

11. The engine control system of claim 1, wherein the driver input corresponds to a position of an accelerator pedal, and wherein the position of the accelerator pedal is at least partially depressed during the shift operation.

12. A method for controlling an automatic transmission, comprising:
increasing engine torque from a first torque level to a second torque level during a period before a shift from a first gear ratio to a second gear ratio, wherein the first gear ratio is greater than the second gear ratio, wherein the first torque level is based on driver input and vehicle speed, and wherein the second torque level is based on the first torque level and the first and second gear ratios;
decreasing a torque capacity of a first clutch to a third torque level during the period; and
increasing a torque capacity of a second clutch to a fourth torque level during the period, wherein the fourth torque level is based on the second torque level and a torque gain of the second clutch.

13. The method of claim 12, further comprising:
increasing engine torque during the period based on a sum of the first torque level and an additional torque amount.

14. The method of claim 13, wherein the additional torque amount is based on a product of the torque capacity of the second clutch and a difference between the first and second gear ratios, divided by a product of the first gear ratio and the torque gain of the second clutch.

15. The method of claim 14, wherein the torque gain of the second clutch is based on a ratio of the torque capacity of the second clutch and the engine torque.

16. The method of claim 14, wherein the fourth torque level is based on a product of the first torque level, the first gear ratio, and the torque gain of the second clutch, divided by the second gear ratio.

17. The method of claim 12, wherein the second torque level is based on a product of the first torque level and the first gear ratio, divided by the second gear ratio.

18. The method of claim 12, wherein the third torque level is zero.

19. The method of claim 12, wherein the torque capacity of the first clutch reaches the third torque level before the torque capacity of the second clutch reaches the fourth torque level.

20. The method of claim 12, further comprising:
controlling engine torque by controlling at least one of a throttle, a plurality of fuel injectors, and a plurality of spark plugs.

21. The method of claim 12, further comprising:
maintaining output torque of the automatic transmission at a constant level before, during, and after the shift operation.

22. The method of claim 12, wherein the driver input corresponds to a position of an accelerator pedal, and wherein the position of the accelerator pedal is at least partially depressed during the shift operation.

* * * * *